United States Patent [19]

Simin et al.

[11] Patent Number: 4,756,573

[45] Date of Patent: Jul. 12, 1988

[54] VEHICLE SEAT WITH BUILT-IN INFANT AND TODDLER SEAT PROVISIONS

[75] Inventors: Gerald L. Simin, Holly; Eugene J. Rogers, Rochester, both of Mich.

[73] Assignee: General Motors Corporation, Detroit, Mich.

[21] Appl. No.: 906,234

[22] Filed: Sep. 10, 1986

[51] Int. Cl.4 .......................... A47C 13/00; A47D 1/10
[52] U.S. Cl. ..................................... 297/250; 297/117; 297/238; 297/254; 297/487
[58] Field of Search ................. 297/232–234, 297/238, 250, 254, 357, 487, 488, 115–117

[56] References Cited

U.S. PATENT DOCUMENTS

| | | | |
|---|---|---|---|
| 1,157,351 | 10/1915 | Weber. | |
| 2,240,748 | 3/1939 | Bak. | |
| 2,436,294 | 2/1945 | Glatstein. | |
| 2,584,481 | 11/1948 | Mast et al. | |
| 2,966,201 | 4/1959 | Strahler | 297/238 |
| 3,206,247 | 9/1965 | Johnson | 297/254 |
| 3,951,450 | 4/1976 | Gambotti. | |
| 4,230,366 | 10/1928 | Ruda | 297/487 |
| 4,533,176 | 8/1985 | Wyttenbach | 297/238 |
| 4,540,216 | 9/1985 | Hassel, Sr. | 297/238 |
| 4,596,420 | 6/1986 | Vaidya | 297/233 |
| 4,634,175 | 7/1987 | Wise | 297/183 |

FOREIGN PATENT DOCUMENTS

| | | | |
|---|---|---|---|
| 2720954 | 12/1977 | Fed. Rep. of Germany | 297/232 |
| 131335 | 7/1985 | Japan | 297/488 |
| 328563 | 4/1950 | United Kingdom | 297/357 |
| 2,023,415 | 1/1980 | United Kingdom | 297/233 |

Primary Examiner—Kenneth J. Dorner
Assistant Examiner—Peter R. Brown
Attorney, Agent, or Firm—Ernest E. Helms

[57] ABSTRACT

The present invention provides a vehicle seat with a built-in toddler seat. The toddler seat is pivotally mounted with respect to the seat back and has a first position forming a lower portion of the seat back and a second position providing an elevated seating position for the toddler seat occupant. In an alternative embodiment of the present invention, a child barrier is pivotally mounted with respect to the seat back and has a first position forming an upper portion of the seat back and a second position which limits the forward movement of the toddler seat occupant. An embodiment of the inventive seat of the present invention described above also provides a novel arrangement for locking in an infant carrier to the vehicle seat.

6 Claims, 3 Drawing Sheets

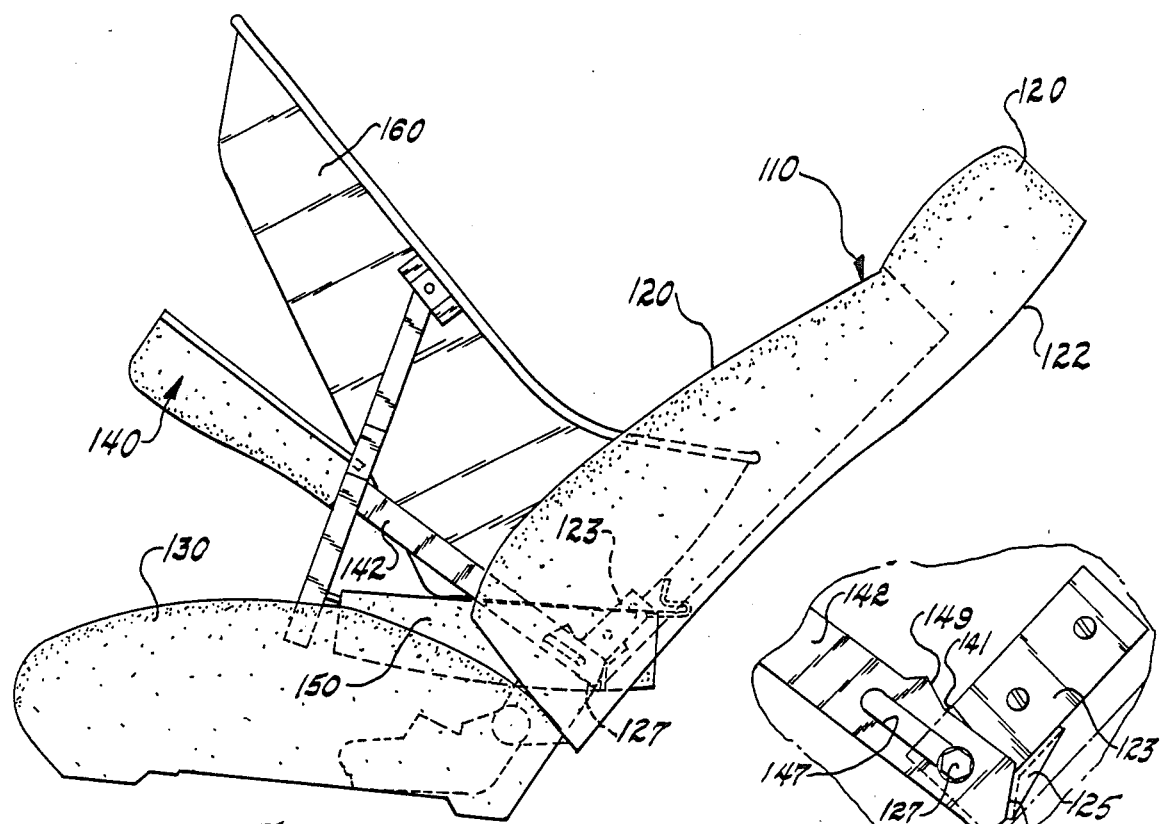
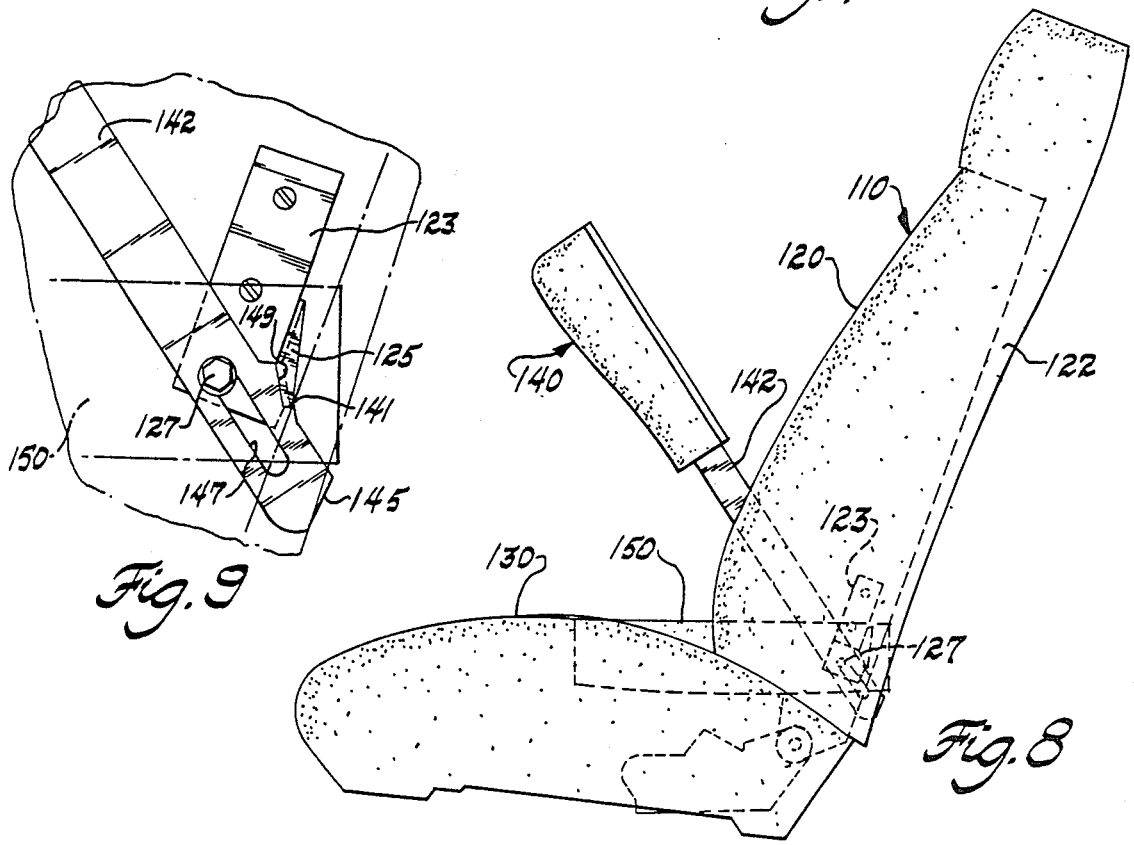

VEHICLE SEAT WITH BUILT-IN INFANT AND TODDLER SEAT PROVISIONS

FIELD OF THE INVENTION

The field of the present invention is that of vehicle seats. More particularly, the field of the present invention is of conventional vehicle seats which are convertible from a normal adult seating position to a child or infant carrying position.

DISCLOSURE STATEMENT

Many jurisdictions have passed various laws that children under a given age or under a given weight must be seated in an approved infant carrier or child seat. Many infant carriers or child seats are bulky and quite cumbersome to attach to the vehicle seat. It is highly desirable to provide a child seat, commonly referred to as a toddler seat, that is integral with the vehicle seat. It is also desirable to provide a vehicle seat which is easily converted from an adult seating position to a toddler seating position. It is also desirable to provide a vehicle seat as described above to which an infant carrier may be securely locked to with a minimum of complexity.

SUMMARY OF INVENTION

To meet the above noted and other desires, the present invention is brought forth. The present invention in its preferred embodiment provides a vehicle seat having an integral toddler seat. In its first position, the toddler seat forms part of the seat's back. The toddler seat is pivotally mounted with respect to the seat back and can be angularly displaced to a second position providing a toddler seat above the femur cushion of the seat. The inventive seat also has a child barrier pivotally mounted with respect to the seat back. The child barrier in its first position forms an upper portion of the seat back and in a second position provides a limit to prevent movement of a toddler seat occupant past a predetermined position. The present invention in its preferred embodiment also provides a simple but secure means to lock an infant carrier to the seat.

It is an object of the present invention to provide an apparatus and method of utilization of the same of a vehicle seat with an integral toddler seat and child barrier. It is also an object of the present invention to provide a vehicle seat and infant carrier combination and method of utilization of the same wherein the infant carrier may be locked to the vehicle seat.

It is also an object of the present invention to provide a vehicle car seat and infant carrier combination including a femur seat cushion, a generally vertically oriented seat back adjacent the femur seat cushion including, a seat back frame, a toddler seat pivotally mounted with respect to the seat back frame whereby the toddler seat in a first position forms a lower portion of the seat back and the toddler seat in a second position provides a seating position above and generally adjacent to the femur cushion, and an infant carrier having means of attachment with the seat back at an end adjacent to the seat back frame and having a pivotally attached generally U-shaped arm adjacent to the femur cushion having means of attachment with the toddler seat whereby the infant carrier is locked with the seat, and a pivotally mounted child barrier whereby the child barrier in a first position forms an upper portion of the seat back and the child barrier in a second position prevents forward movement of a toddler seat occupant beyond a predetermined limit, and the child barrier in a third position prevents movement of the infant carrier beyond a predetermined limit.

It is still yet another object of the present invention to provide a method of locking an infant carrier to a vehicle seat having a femur cushion and a seat back including a toddler seat pivotally mounted with respect to the seat back frame having a first position providing a lower portion of the seat back and a second position providing a toddler seat above the femur cushion and the seat back including a child barrier pivotally mounted with respect to the seat back frame having a first position forming an upper portion of the seat back and having at least one other position generally adjacent to the femur cushion, and the infant carrier having means of attachment with the seat back frame and the infant carrier having a U-shaped arm with means of attachment with the toddler seat cushion, the method including angularly displacing the toddler cushion from the first to the second position, angularly displacing the child barrier from the first position to the position adjacent with the femur cushion, encircling the child barrier with the infant carrier U-shaped arm and fixably attaching the child barrier with the seat back frame and fixably attaching the U-shaped arm with the toddler seat whereby the infant carrier is locked with the vehicle seat.

Other objects, desires and advantages of the present invention will become more apparent to those skilled in the art as the nature of the invention is better understood from the accompanying drawings and a detailed description.

BRIEF DESCRIPTION OF THE DRAWINGS

FIG. 6 is a side elevational view of a reclining vehicle seat of the present invention;

FIG. 7 is a partial side elevational view of a portion of the seat illustrated in FIG. 6;

FIG. 8 is a side elevational view of the seat in a toddler seat position; and

FIG. 9 is a partial side elevational view of the seat illustrated in FIG. 8.

DETAILED DESCRIPTION OF THE DRAWINGS

Figure 1:
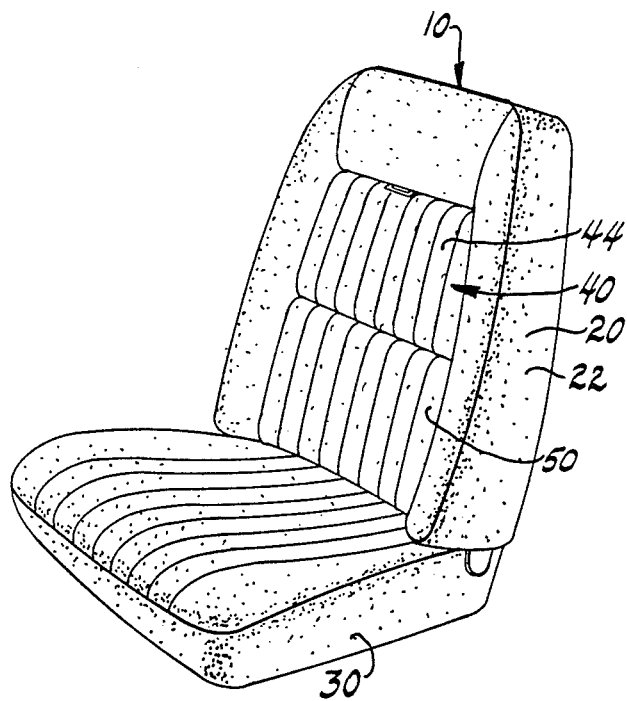
FIG. 1 is a perspective view of a preferred embodiment vehicle seat of the present invention in a normal adult seating position.

Referring to FIGS. 1, 2, 3, 4, and 5, the vehicle seat 10 with a built-in toddler seat of the present invention has a generally horizontally oriented femur seat cushion 30. Adjacent to the femur seat cushion 30 and oriented generally vertically is a seat back 20. As shown in FIG. 1 the vehicle seat 10 is in a normal adult seating position. As illustrated in FIG. 1 the vehicle seat is a conventional seat however the present invention includes recliner type seats as illustrated in FIGS. 6–9.

The seat back 20 of the present invention has three major components. The first component is the seat back frame 22 which is typically pivotally attached to the femur seat cushion 30. Pivotally mounted with respect to the seat back frame 22 is a toddler seat 50. The toddler seat has a first position forming a lower portion of the seat back. The toddler seat may be angularly displaced to a second position providing a seating position above and generally adjacent to the femur seat cushion 30. Fixably attached to the seat back frame 22 is a belt restraint 70 which is typically a double breasted shoulder restraint having a buckle 72 which fits into the toddler seat belt restraint latch receptacle 57. The toddler seat belt latch receptacle 57 typically will be on the end of the toddler seat 50 which is opposite seat back frame 22 when the toddler seat 50 is in its second position so that it will not be felt or observed by an adult seat occupant when the toddler seat 50 is in its first position.

To prevent movement of a toddler seat occupant beyond a predetermined limit a child barrier 40 is provided. The child barrier 40 has an arm 42 which is pivotally mounted with respect to the seat back frame 22. The arm 42 has a pad 44 pivotally connected opposite the seat back frame 22. The child barrier 40 forms an upper portion of the vehicle seat back 20 in a first position. When angularly displaced to a second position (FIG. 5), the child barrier 40 prevents excessive forward movement of a toddler seat occupant. The child barrier pad 44 is pivotal with respect to the child barrier arm 42 and is spaced from seat back frame 22, allowing the pad 44 to be pivoted downward clockwise or counterclockwise giving the toddler seat occupant greater visibility.

As the child progresses in physical size, the toddler seat 50 with or without the child barrier 40 may still be utilized and the double breasted shoulder restraint may be tucked into the seat back frame 22 along edge 23 and the normal vehicle belt restraint, not shown may be utilized. Thereby the small child will have a superior seating position with greater visibility and hence a more enjoyable vehicle ride.

Figure 2:
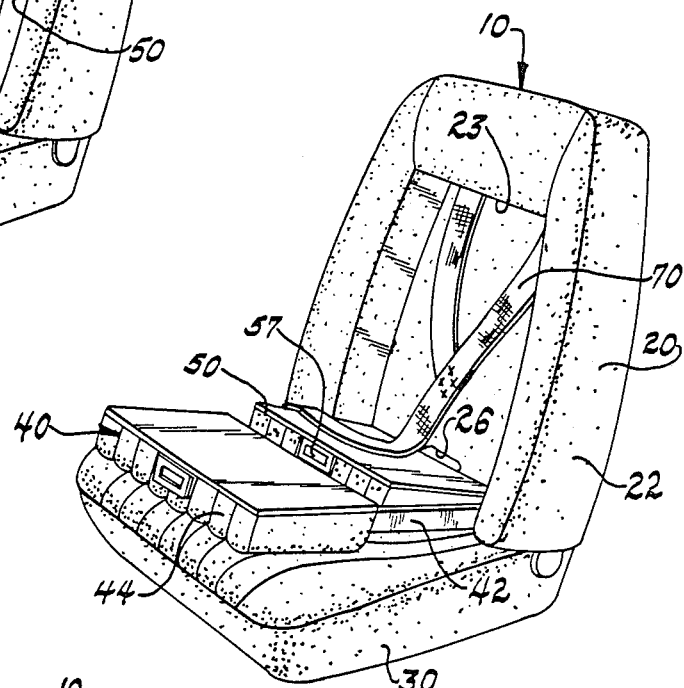
FIG. 2 is a perspective view of the seat illustrated in FIG. 1 as shown in the toddler seat and child barrier adjacent to the femur cushion.
Figure 3:
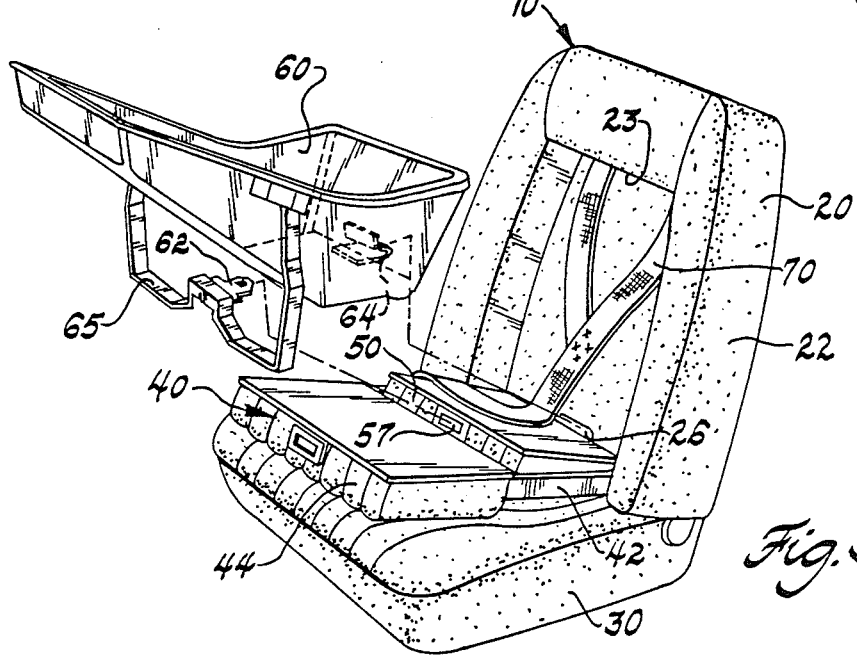
FIG. 3 is a perspective view of the inventive seat of the present invention before the locking of the infant carrier to the seat.
Figure 4:
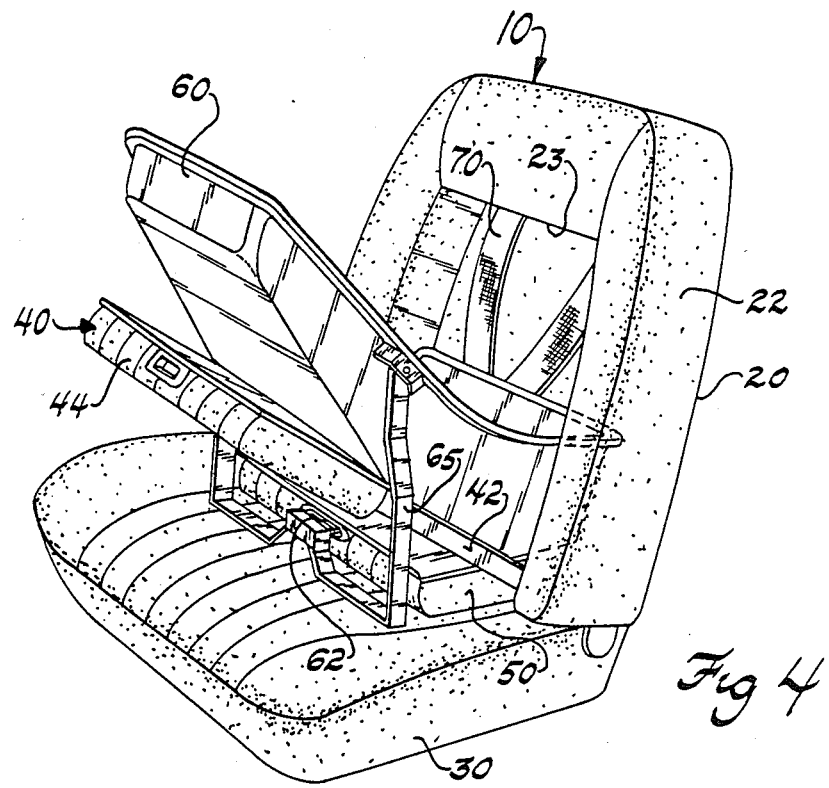
FIG. 4 is a perspective view of the vehicle seat of the present invention with the infant carrier locked in position.
Figure 5:
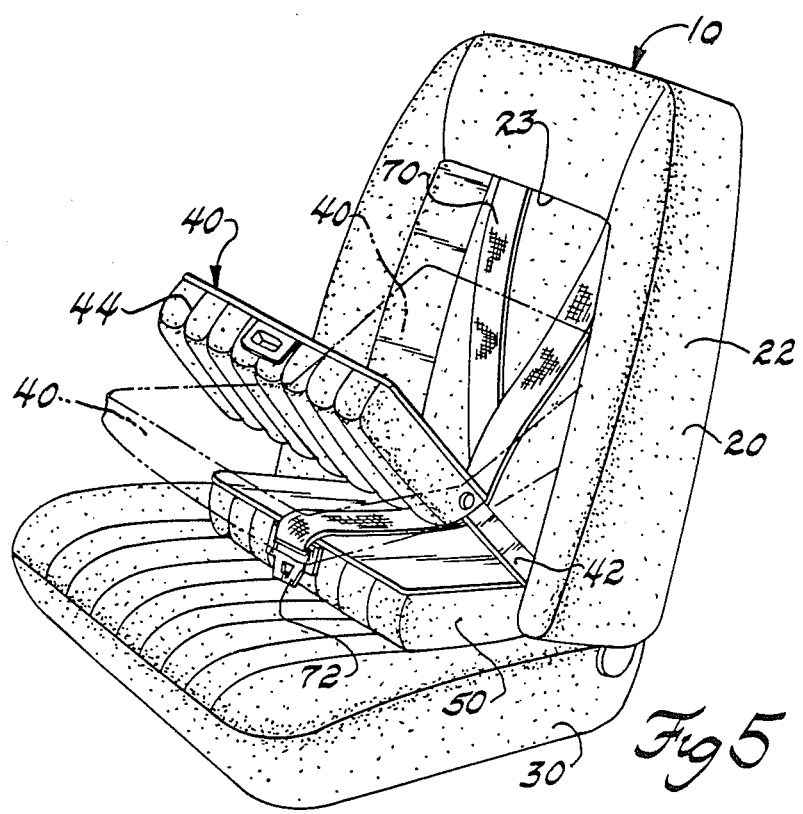
FIG. 5 is a perspective view illustrating the seat in the toddler seating position.

Referring to FIGS. 2, 3 and 4, typically for very young children an infant carrier 60 will be utilized. To position the seat to lock in the infant carrier 60 the toddler seat 50 is pivoted downward from the first position to the second position. The child barrier 40 will be angularly displaced from its first position to a position generally adjacent to the femur seat cushion 30.

The infant carrier 60 has a front 62 and rear 64 means of attachment with the vehicle seat 10 via the seat back frame 22 and the toddler seat belt restraint latch receptacle 57. The infant carrier 60 is nested on top of the toddler seat 50. The rear of the infant carrier has a latch 64 which snaps into a latch receptacle 26 of the seat back frame 22. The infant carrier 60 also has a pivotally attached U-shaped arm 65 which encircles the child carrier 60 and has a latch or buckle 62 which snaps into the seat belt restraint latch receptacle 57 of the toddler seat. The infant carrier 60 is now locked with the seat 10. The child barrier 40 can then be angularly lifted to an alternative or third position to prevent movement of the infant carrier 60 beyond a predetermined limit.

To remove the infant carrier 60, a release means (not shown) is typically placed on the rear of the seat back frame 22 allowing the rear end of the infant carrier 60 to be released. A normal seat belt release (not shown) is placed upon the toddler seat 50 allowing the buckle 62 to be pulled out.

Referring to FIGS. 6, 7, 8 and 9 the recliner seat 110 is substantially similar to seat 10. Toddler seat 150 and child barrier arm 142 are pivotally mounted to pin 127 of the seat back frame. 122 with slot 147 encircling pin 127.

When infant carrier 160 is locked to seat 110, seat back 120 is first placed in a reclined position. In seat 110, child barrier arm 142 has first, second (FIGS. 8, 9) and third (FIGS. 6, 7) positions as previously described. In the first (upright adult) position, pin 127 will be at the upper end of slot 147. To move the child barrier 140 to the second position, the child barrier 140 is angularly displaced until ratchet surface 149 makes contact with a stop 125 which is in turn fixably connected with seat back frame structural member 123 and the child barrier arm 142 is restrained from further movement angularly downwards.

To move the child barrier from the second position to a lower third position more adjacent to the femur seat cushion 30, the child barrier must first be angularly displaced rearwardly towards the seat back frame 122 and then linearly displaced outwards until ratchet tooth 141 can clear stop 125. The child barrier arm 142 can then be angularly displaced forwardly to the third position (FIGS. 6, 7) where upon the child barrier arm via ratchet surface 145 will again make contact with stop 125. Child barrier arm 142 is now locked in position with pin 127 contacting the bottom end of slot 147. If desired the third position can be the angular limit of the child barrier with respect to the femur seat cushion 130.

The child barrier has a slot and pin pivotable connection with the seat back frame 122 wherein it is provided with two locking positions when it is angularly displaced from the first position and to be moved out of this position requires that the barrier 140 be linearly displaced. Slot 147 encircles pin 126, movement of child barrier arm outward is prevented by the bottom portion of slot 142 engaging pin 127. The extreme angular positions of child barrier arm 142 are defined or limited by the bottom portion of slot 142 engaging pin 127 and the child barrier arm 142 contacting stop 125.

The present invention provides a method to convert an adult seat having a femur cushion 30, a seat back 20 which includes a toddler seat 50 pivotally mounted with respect to the seat back frame 22 having a first position forming a lower portion of the seat back and a second position forming a toddler seat above the femur seat cushion 30 and having a child barrier 40 pivotally mounted with respect to the seat back frame 22 having a first position forming an upper portion of the seat back and a second position to prevent movement of a toddler seat occupant beyond a predetermined limit, including the following steps:

1. Angularly displacing the toddler seat 50 from the first to the second position;
2. Angularly displacing the child barrier 40 from the first to the second position.

The present invention also provides a method of locking an infant carrier 60 to a vehicle seat 10 having a femur seat cushion 30 and a seat back 20 including a toddler seat 50 pivotally mounted with respect to the seat back frame 22 having a first position providing a lower portion of the seat back and a second position providing a toddler seat 50 above the femur cushion 30 and the seat back also includes a child barrier 40 pivotally mounted with respect to the seat back frame 22 having a first position forming an upper portion of the seat back and having at least one other position generally adjacent to the femur seat cushion 30, and an infant carrier having means of attachment 64 with said seat back frame 22 and the infant carrier 60 having a U-shaped arm 65 with means of attachment 62 with said toddler seat cushion 50, the method including the steps of:

1. Angularly displacing the toddler seat 50 from said toddler seats first to second position;
2. Angularly displacing the child barrier 40 from the first position to place said child barrier 40 in a position generally adjacent with the said femur seat cushion 30;
3. Encircling the child barrier with the infant carrier U-shaped arm 65;
4. Fixably attaching the infant carrier 60 with the seat back frame 22;
5. Fixably attaching the U-shaped arm 65 with the toddler seat 50 whereby said infant carrier 60 is locked with said vehicle seat 10.

While a few of the embodiments of the present invention have been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A vehicle seat with a built-in toddler seat, said seat in combination comprising:
   a femur seat cushion; and
   a generally vertically oriented seat back adjacent said femur seat cushion, said seat back including:
   a seat back frame with a pin and a fixably connected stop;
   a toddler seat pivotally mounted with respect to said seat back frame whereby said toddler seat in a first position forms a lower portion of said seat back and said toddler seat in a second position provides a seating position above and generally adjacent to said femur seat cushion; and
   a child barrier with an arm pivotally mounted with respect to said seat back frame adjacent said femur seat cushion and said child barrier arm having a slot encircling said seat back frame pin whereby said child barrier in a first position forms an upper portion of said seat back and said child barrier in a second position contacts said stop and prevents movement of a toddler seat occupant beyond a predetermined limit, and said child barrier in a third position is lower than said second position and is more adjcent to said femur seat cushion, and whereby angular downward movement of said child barrier from said second position to said third position requires said child barrier to be pivoted rearwardly toward said seat back frame away from contact with said stop and be linearly displaced outwardly and then pivoted forwardly away from said seat back frame to again contact said child barrier with said stop and whereby the extreme angular positions of said child barrier are limited by the bottom portion of said slot engaging with said pin and said child barrier contacting said stop.

2. A vehicle seat and infant carrier combination comprising:
   a femur seat cushion; and
   a generally vertically oriented seat back adjacent said femur seat cushion, sadi set back including:
   a seat back frame with a latch receptacle;
   an a toddler seat pivotally mounted with respect to said seat back frame adjacent said femur cushion whereby said toddler seat in a first position forms a lower portion of said seat back and said toddler seat in a second position provides a seating position above and generally adjacent to said femur cushion and has a belt latch receptacle along an end of said toddler seat opposite said back frame; and
   an infant carrier nested on top of said toddler seat having a pivotally attached U-shaped arm with a latch for attachement with said toddler seat belt latch receptacle and a latch at an end of said infant seat adjacent said seat back for attachment with said seat back latch receptacle whereby said toddler seat is locked with said vehicle seat.

3. A vehicle seat and infant carrier combination as described in claim 2 further including a child barrier pivotally mounted with respect to said seat back frame having a first position providing an upper portion of said seat back and said child barrier in a alternative position preventing movement of said infant carrier beyond a predetermined limit.

4. A vehicle car seat and infant carrier combination comprising a femur seat cushion; and
   a generally vertically oriented seat back adjacent said femur seat cushion, said seat back including:
   a seat back frame with a latch receptacle;
   a toddler seat pivotally mounted with respect to said seat back frame adjacent said femur cushion whereby said toddler seat in a first position forms a lower portion of said seat back and said toddler seat in a second position provides a seating position above and generally adjacent to said femur cushion and said toddler seat in said second position has a belt latch receptacle along an end of said toddler seat opposite said seat back frame;
   an infant carrier with a latch at an end of said infant seat adjacent said seat back for attachment with said seat back latch receptacle and said infant carrier has a pivotally attached generally U-shaped arm adjacent said feumur cushion with a latch for attachment with said toddler seat latch receptacle when said toddler seat is in said second position whereby said infant carrier is locked with said seat; and
   a child barrier pivotally mounted with respect to said seat back frame adjacent said femur support whereby said child barrier in a first position forms an upper portion of said seat back and said child barrier in a second position prevents movement of a toddler seat occupant beyond a predetermined limit, and said child barrier in a third position extends underneath said U-shaped arm and prevents movement of said infant carrier beyond a predetermined limit and movement angularly downward of said child barrier from said second position to said third positions requires said child barrier to be pivoted toward said seat back frame and to be linearly moved outwardly and then pivoted away from said seat back frame, and movement angularly downward of said child barrier from said third position is prevented.

5. A method of converting an adult seat having a femur cushion, a seat back which includes a seat back frame with a pin and a fixably connected stop and a toddler seat pivotally mounted with respect to said seat back frame having a first position forming a lower portion of said seat back and a second position forming a seating position above said femur cushion and having a child barrier with an arm pivotally mounted with respect to said seat back frame adjacent said femur cushion and said child barrier arm having a slot encircling said pin, and said child barrier having a first position forming an upper portion of said seat back and a second position contacting said stop preventing movement of a toddler seat occupant beyond a predetermined limit and said child barrier in a third position is lower than said second position and is more adjacent to said femur seat cushion, said method in combination comprising:
- angularly displacing said toddler seat from said first to said second position whereby said toddler seat provides a seating position above said cushion;
- angularly displacing said child barrier from said first to said second position whereby movement of a toddler seat occupant beyond a predetermined distance is limited; and
- preventing said child barrier from angularly moving downwards to said third position unless said child barrier is pivoted rearwardly toward said seat back frame away from contacting with said stop and then is linearly moved outward and then is forwardly pivoted away from said seat back frame to again be contacting with said stop and limiting the angular extreme positions of said child barrier by said bottom portion of said slot engaging with said pin and said child barrier contacting said stop.

6. A method of locking an infant carrier to a vehicle seat having a femur cushion member and a seat back including a seat back frame with a latch receptacle and a toddler seat pivotally mounted with respect to said seat back frame having a first position providing a lower portion of said seat back and a second position providing a seating position above said femur cushion and said toddler seat having a belt latch receptacle along an end of said toddler seat opposite said back frame and said seat back including a child barrier pivotally mounted with respect to said seat back frame having a first position forming an upper portion of said seat and having at least one other position generally adjacent to said femur cushion, and said infant barrier having a latch at an end of said infant seat adjacent said seat back for attachment with said seat back latch receptacle and said infant carrier having a U-shaped arm with a latch for attachment with said toddler seat belt latch receptacle, said method in combination comprising:
- angularly displacing said toddler seat from said first to said second position;
- angularly displacing said child barrier from said first position to place said child barrier in said position adjacent with said femur cushion;
- encircling said child barrier with said infant carrier U-shaped arm;
- fixably attaching said infant carrier latch with said seat back frame latch receptacle and;
- fixably attaching said U-shaped arm latch with said toddler seat latch receptacle whereby said infant carrier is locked with said vehicle seat.

* * * * *